(12) United States Patent
Li (10) Patent No.: US 11,979,830 B2
(45) Date of Patent: May 7, 2024

(54) METHOD FOR USING POWER SAVING SIGNALING PATTERN, TERMINAL, AND COMPUTER READABLE STORAGE MEDIUM

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 340 days.

(21) Appl. No.: 17/430,105

(22) PCT Filed: Feb. 13, 2019

(86) PCT No.: PCT/CN2019/074988
§ 371 (c)(1),
(2) Date: Aug. 11, 2021

(87) PCT Pub. No.: WO2020/164020
PCT Pub. Date: Aug. 20, 2020

(65) Prior Publication Data
US 2022/0150834 A1 May 12, 2022

(51) Int. Cl.
*H04W 52/02* (2009.01)
(52) U.S. Cl.
CPC ....... *H04W 52/0216* (2013.01); *H04W 52/02* (2013.01); *H04W 52/0235* (2013.01)
(58) Field of Classification Search
CPC ......... H04W 52/0216; H04W 52/0219; H04W 52/0232; H04W 52/02; H04W 52/023; H04W 76/28
See application file for complete search history.

(56) References Cited

U.S. PATENT DOCUMENTS

| 2005/0135528 A1* | 6/2005 | Miyamoto | H04L 7/042 |
| | | | 375/357 |
| 2010/0241888 A1* | 9/2010 | Kaneko | G06F 1/3246 |
| | | | 713/320 |
| 2011/0305215 A1 | 12/2011 | Hofmann et al. | |

(Continued)

FOREIGN PATENT DOCUMENTS

| CN | 108235412 A | 6/2018 |
| CN | 109219116 A | 1/2019 |

OTHER PUBLICATIONS

Japanese Patent Application No. 2021-547113, Office Action dated Jul. 29, 2022, 3 pages.

(Continued)

*Primary Examiner* — Jean A Gelin
(74) *Attorney, Agent, or Firm* — COZEN O'CONNOR (57) ABSTRACT

A method for using a power saving signaling pattern, a terminal, and a computer readable storage medium. The method includes: determining, by a terminal, a Discontinuous Reception (DRX) timer in an operating state, the DRX timer being one of: an on duration timer with a long DRX cycle and an on duration timer with a short DRX cycle; determining, by the terminal, a pattern for monitoring the power saving signaling based on the DRX timer; and monitoring, by the terminal, the power saving signaling based on the determined pattern for monitoring the power saving signaling.

12 Claims, 6 Drawing Sheets

(56) References Cited

U.S. PATENT DOCUMENTS

| | | | |
|---|---|---|---|
| 2012/0213137 A1* | 8/2012 | Jeong | H04W 52/0235 370/311 |
| 2012/0250599 A1 | 10/2012 | Henttonen et al. | |
| 2013/0107723 A1* | 5/2013 | Dhanda | H04W 76/28 370/241 |
| 2013/0237171 A1* | 9/2013 | Lindoff | H04W 52/0274 455/343.1 |
| 2013/0308510 A1* | 11/2013 | Ji | H04W 52/0251 370/311 |
| 2015/0181526 A1 | 6/2015 | Lee et al. | |
| 2015/0365894 A1* | 12/2015 | Bai | H04L 1/1854 370/311 |
| 2016/0014697 A1* | 1/2016 | Mujtaba | H04L 25/00 370/311 |
| 2016/0128128 A1* | 5/2016 | Ang | H04W 76/28 370/311 |
| 2017/0118792 A1* | 4/2017 | Rico Alvarino | H04W 72/23 |
| 2018/0332533 A1 | 11/2018 | Bhattad et al. | |
| 2019/0281546 A1* | 9/2019 | Lim | H04L 1/0027 |
| 2020/0029302 A1* | 1/2020 | Cox | H04W 56/0015 |
| 2021/0176710 A1* | 6/2021 | Tooher | H04W 52/0219 |
| 2021/0321446 A1* | 10/2021 | Lee | H04L 5/0051 |
| 2022/0210827 A1* | 6/2022 | Wang | H04W 16/14 |
| 2023/0328648 A1* | 10/2023 | Freda | H04W 52/0251 370/311 |

OTHER PUBLICATIONS

Japanese Patent Application No. 2021-547113, English translation of Office Action dated Jul. 29, 2022, 3 pages.

LG Electronics "Discussions on triggering adaptation of UE power consumption characteristics" 3GPP TSG RAN WG1 Ad-Hoc Meeting 1901, R1-1900600; Jan. 2019; 8 pages.

ZTE "Further Considerations on triggering for UE power saving" 3GPP TSG RAN WG1 Meeting AH-1901, R1-1900227; Jan. 2019; 11 pages.

European Patent Application No. 19914925.3, Search and Opinion dated Jan. 10, 2022, 11 pages.

Indian Patent Application No. 202147039797, Office Action dated Feb. 7, 2024, 3 pages.

* cited by examiner

METHOD FOR USING POWER SAVING SIGNALING PATTERN, TERMINAL, AND COMPUTER READABLE STORAGE MEDIUM

CROSS-REFERENCE TO RELATED APPLICATION

This application is a national phase of International Application No. PCT/CN2019/074988, filed on Feb. 13, 2019, the entire contents of which are incorporated herein by reference.

TECHNICAL FIELD

The disclosure relates to the field of communications, and more particularly, to a method for using a power saving signaling pattern, a terminal, and a computer readable storage medium.

BACKGROUND

A Wake-Up Signaling (WUS) is introduced for a Narrow Band Internet of Things (NB-IoT) project and an enhanced Machine Type Communication (eMTC) project in version R15 of a Third Generation Partnership Project (3GPP).

WUS is a low-power detection signal usually placed in a signaling cycle before a time for monitoring a Physical Downlink Control Channel (PDCCH). When UE (User Equipment) detects WUS, it is necessary to monitor PDCCH; when a UE doesn't detect WUS, it may skip monitoring PDCCH. WUS may further occur in a certain cycle, and UE wakes up and monitors WUS in a fixed cycle.

SUMMARY

According to one aspect of the disclosure, a method for using a power saving signaling pattern is disclosed. The method includes: determining, by a terminal, a DRX timer in an operating state, the DRX timer being one of: an on duration timer with a long DRX cycle and an on duration timer with a short DRX cycle; determining, by the terminal, a pattern for monitoring the power saving signaling based on the DRX timer; and monitoring, by the terminal, the power saving signaling based on the determined pattern for monitoring the power saving signaling.

According to another aspect of the disclosure, a terminal is disclosed. The terminal includes: a processor; a transceiver coupled to the processor; and a memory configured to store instructions executable by the processor. The processor is configured to load and execute the executable instructions to implement the method for using the power saving signaling pattern as described in the first aspect.

According to another aspect of the disclosure, a computer readable storage medium is disclosed. The computer readable storage medium stores at least one instruction, at least one program, a code set, or an instruction set. The at least one instruction, the at least one program, the code set, or the instruction set is loaded and executed by a processor to implement the method for using the power saving signaling pattern as described in the first aspect.

BRIEF DESCRIPTION OF THE DRAWINGS

The accompanying drawings herein, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
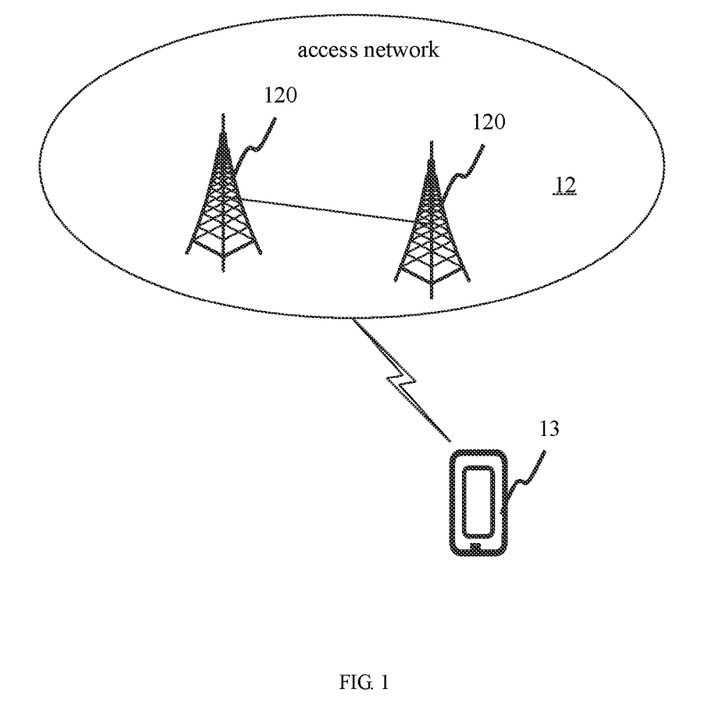
FIG. 1 is a schematic diagram illustrating a structure of a communications system according to an example embodiment in the disclosure.

FIG. 1 is a schematic diagram illustrating a structure of a communications system according to an example embodiment in the disclosure. As illustrated in FIG. 1, the communications system may include an access network 12 and a terminal 13.

The access network 12 includes several access network devices 120. The access network device 120 and the core network device 110 (not shown) communicate with each other through some kind of interface technology, for example, an Si interface in the LTE (Long Term Evolution) system, an NG (New Generation) interface in the 5G NR (New Radio) system. The access network device 120 may be a base station (BS), in which the base station is an apparatus deployed in the access network to provide wireless communication functions for terminals. The base station may include various forms of macro base stations, micro base stations, relay stations, access points, etc. In the systems adopting different wireless access technologies, names of the devices with the base station function may vary. For example, in the LTE system, it is referred to as eNodeB or eNB; in the 5G NR system, it is referred to as gNodeB or gNB. With the evolution of communications technologies, the name of "base station" may vary. For convenience of description, in embodiments of the disclosure, the above apparatus that provides wireless communication functions for the terminals is collectively referred to as the access network device.

The terminal 13 may include all kinds of handheld devices, vehicle devices, wearable devices, and computing devices, with wireless communication function, or other processing devices coupled to wireless modems, as well as various forms of user equipment (UE), mobile stations (MSs), terminal devices, etc. For convenience of description, the device mentioned above is collectively referred to as the terminal. The access network device 120 and the terminal 13 communicate with each other through some kind of air interface technology, for example, a Uu interface.

DRX may make UE, for example, terminal 13, enter an Opportunity for DRX (a sleep mode) periodically at some time points without monitoring scheduling information of PDCCH (a subframe of PDCCH). When UE needs to monitor the scheduling information of PDCCH, UE wakes up from the Opportunity for DRX, so that UE may achieve a purpose of power saving.

Figure 2:
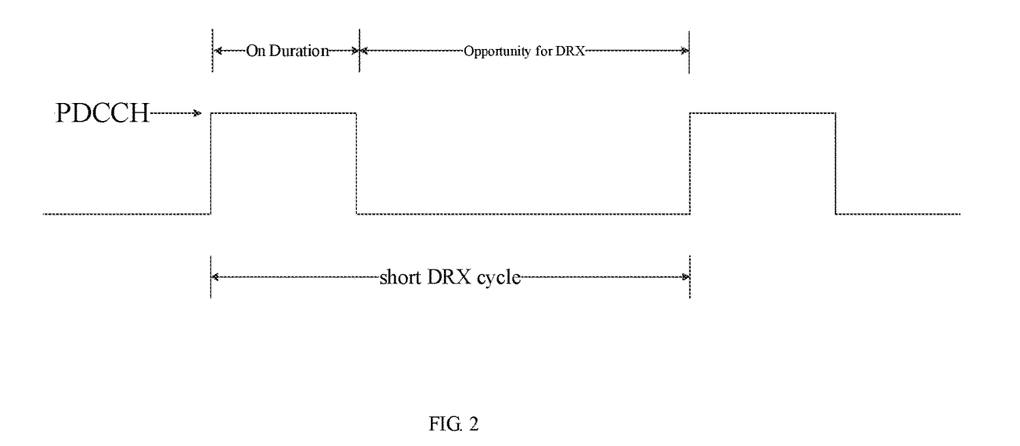
FIG. 2 is a schematic diagram illustrating a DRX cycle related in the disclosure.

The basic mechanism of DRX is to configure a DRX cycle for UE in an RRC_CONNECTED state. The DRX cycle includes an on duration and an opportunity for DRX: in the on duration, UE monitors and receives scheduling information of PDCCH; in the opportunity for DRX, UE does not receive data of a downlink channel to save power consumption. As illustrated in FIG. 2, in a time domain, there are continuous DRX cycles provided. When UE receives a scheduling message during the on duration, UE may start a DRX-inactivity timer and monitor scheduling information of PDCCH in each subframe of the on duration; when the DRX-inactivity timer is running, even if the originally-configured on duration has ended, UE still needs to continue monitoring the downlink subframe of PDCCH till the DRX-inactivity timer times out.

Figure 3:
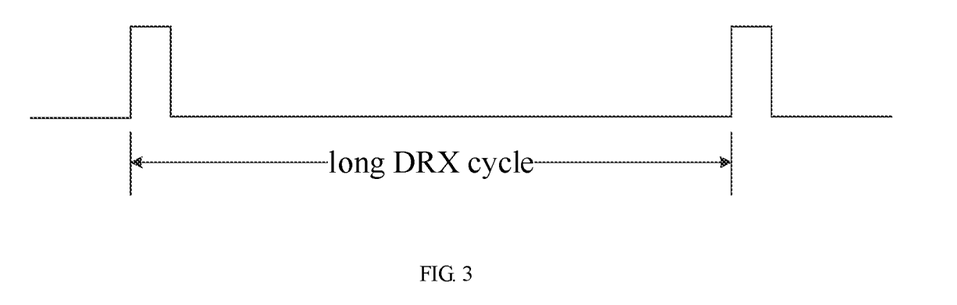
FIG. 3 is a schematic diagram illustrating a long cycle and a short cycle of a DRX related in the disclosure.

The DRX cycle equals to a sum of a wake-up duration and an Opportunity for DRX duration of UE, in which, the wake up duration is a duration of the on duration in the cycle, and the Opportunity for DRX duration is a duration of the Opportunity for DRX in the cycle. In the communications system, the system may configure a short DRX cycle as illustrated in FIG. 2 or a long DRX cycle as illustrated in FIG. 3 for UE according to different scenarios. The Opportunity for DRX duration of the long DRX cycle is longer than the Opportunity for DRX duration of the short DRX cycle, or a proportion of the Opportunity for DRX duration of the long DRX cycle is larger than a proportion of the Opportunity for DRX duration of the short DRX cycle.

There is no suitable solution when the power saving signaling and DRX work together.

In a possible implementation in the related art, in a scenario where DRX is configured, the power saving signaling is usually configured before the DRX on duration. If UE does not detect the power saving signaling, it needs to skip the entire active state. In this way, it is equivalent that UE may use the pattern for monitoring the power saving signaling before entering the active state duration. In this case, the subsequent inactive state and the short period may not be turned on, which may cause a larger delay.

The disclosure provides a solution to how the power saving signaling and DRX work together. That is, after UE enters the on duration, it is determined whether to use the pattern for monitoring the power saving signaling during different DRX timer operation periods (an on duration timer with a long DRX cycle, an inactivity timer, an on duration timer with a short DRX cycle, and a retransmission timer) and which pattern for monitoring the power saving signaling may be used.

A power saving signaling, referred to as an energy-saving signaling, includes a Wake-Up Signal (WUS). The following takes WUS for an example for further description. However, the power saving signaling may be not limited to WUS, and may be a ZC (Zadoff-chu) sequence, a predetermined bit in downlink control information (DCI), and other possible implementations.

Figure 4:
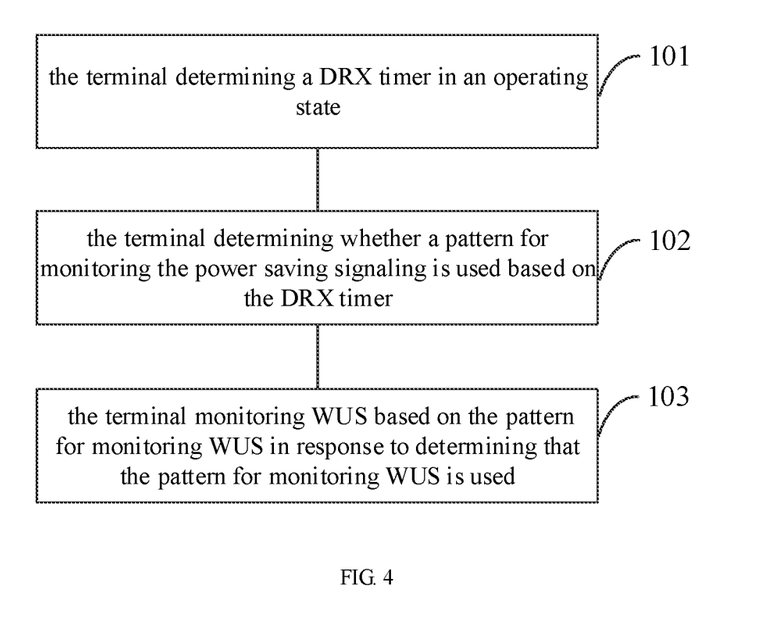
FIG. 4 is a flowchart illustrating a method for using a power saving signaling pattern according to an example embodiment.

FIG. 4 is a flowchart illustrating a method for using a power saving signaling pattern according to an example embodiment. The method may be executed by the terminal in the communications system as illustrated in FIG. 1. The method may include following.

At block 101, the terminal determines a DRX timer in an operating state.

The DRX timer is a timer related to a DRX mechanism.

The type of the DRX timer determined by the terminal may include any one of: an on duration timer with a long DRX cycle, a DRX-inactivity timer, an on duration timer with a short DRX cycle, and a retransmission timer.

At block 102, the terminal determines whether a pattern for monitoring the power saving signaling is used based on the DRX timer. The embodiments take using a pattern for monitoring WUS as an example.

The terminal determines whether to perform a monitoring pattern using WUS based on the type of the DRX timer.

At block 103, the terminal monitors WUS based on the pattern for monitoring WUS in response to determining that the pattern for monitoring WUS is used.

The terminal determines whether to use the pattern for monitoring WUS based on different states and which pattern for monitoring WUS is used when determining to use the pattern for monitoring WUS.

The pattern for monitoring WUS includes a cycle of WUS and a start time offset of WUS.

In summary, according to the method provided in the embodiments, it may be determined whether to use the power saving signaling pattern based on the DRX timer. When the power saving signaling pattern is used, the power saving signaling pattern may be used for monitoring. Different methods for using the power saving signaling may be selected based on types of different DRX timers, for example, using a power saving signaling pattern with a high monitoring density, using a power saving signaling pattern with a low monitoring density, not using the power saving signaling pattern in a scenario with low delay requirements. Therefore, the problem about how the power saving signaling and the DRX work together may be solved.

Figure 5:
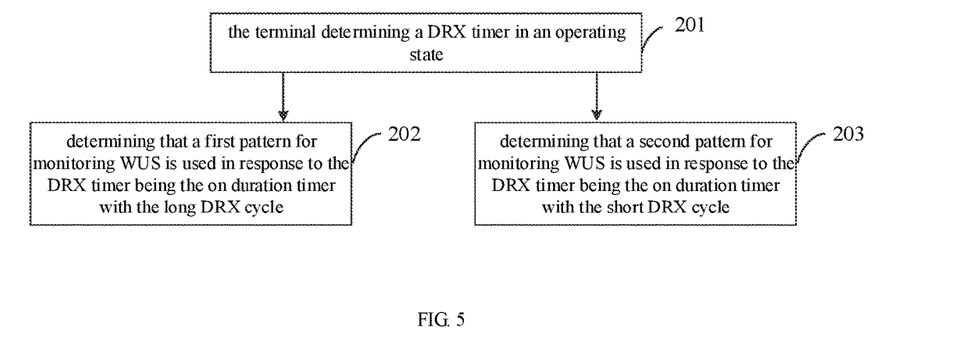
FIG. 5 is a flowchart illustrating another method for using a power saving signaling pattern according to an example embodiment.

FIG. 5 is a flowchart illustrating another method for using a power saving signaling pattern according to an example embodiment. The method may be executed by the terminal in the communications system as illustrated in FIG. 1. The method may include following.

At block 201, the terminal determines a DRX timer in an operating state.

In some embodiments, the DRX timer may include the on duration timer with the long DRX cycle or the on duration timer with the short DRX cycle.

When the DRX timer is the on duration timer with the long DRX cycle, an action in block 202 is executed.

When the DRX timer is the on duration timer with the short DRX cycle, an action in block 203 is executed.

At block 202, it is determined that a first pattern for monitoring WUS is used in response to the DRX timer being the on duration timer with the long DRX cycle.

At block 203, it is determined that a second pattern for monitoring WUS is used in response to the DRX timer being the on duration timer with the short DRX cycle.

The first pattern for monitoring WUS is same with the second pattern for monitoring WUS, or the first pattern for monitoring WUS is different from the second pattern for monitoring WUS. The monitoring pattern is not limited in some embodiments.

Optionally, when the different first pattern for monitoring WUS and second pattern for monitoring WUS are used, a time delay of the second pattern for monitoring WUS is less than a time delay of the first pattern for monitoring WUS. Or, a monitoring granularity of the second pattern for monitoring WUS is higher than a monitoring granularity of the first pattern for monitoring WUS.

In summary, in the method provided in some embodiments, the terminal determines which pattern for monitoring WUS is used based on the type of the DRX timer, that is, different patterns for monitoring WUS may be used or the same pattern for monitoring WUS may be used when the DRX timer is in different operating states.

When different patterns for monitoring WUS are used, the time delay of the second pattern for monitoring WUS is less than the time delay of the first pattern for monitoring WUS. Therefore, the terminal reduces the influence on data transmission due to the time delay caused by WUS under the short DRX cycle.

Figure 6:
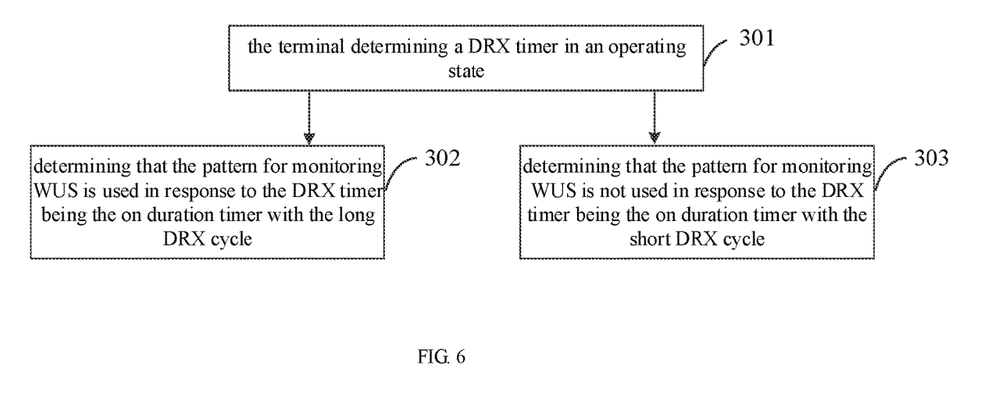
FIG. 6 is a flowchart illustrating another method for using a power saving signaling pattern according to an example embodiment.

FIG. 6 is a flowchart illustrating another method for using a power saving signaling pattern according to an example embodiment. The method may be executed by the terminal in the communications system as illustrated in FIG. 1. The method may include following.

At block 301, the terminal determines a DRX timer in an operating state.

The DRX timer may include the on duration timer with the long DRX cycle or the on duration timer with the short DRX cycle.

When the DRX timer is the on duration timer with the long DRX cycle, an action in block 302 is executed.

When the DRX timer is the on duration timer with the short DRX cycle, an action in block 303 is executed.

At block 302, it is determined that the pattern for monitoring WUS is used in response to the DRX timer being the on duration timer with the long DRX cycle.

At block 303, it is determined that the pattern for monitoring WUS is not used in response to the DRX timer being the on duration timer with the short DRX cycle.

In summary, in the method provided in some embodiments, the terminal determines whether the pattern for monitoring WUS is used based on the type of the DRX timer. When the DRX timer is the on duration timer with the short cycle, it is determined that the pattern for monitoring WUS is not used. Therefore, the terminal avoids the influence on data transmission due to the time delay caused by WUS under the short DRX cycle.

Figure 7:
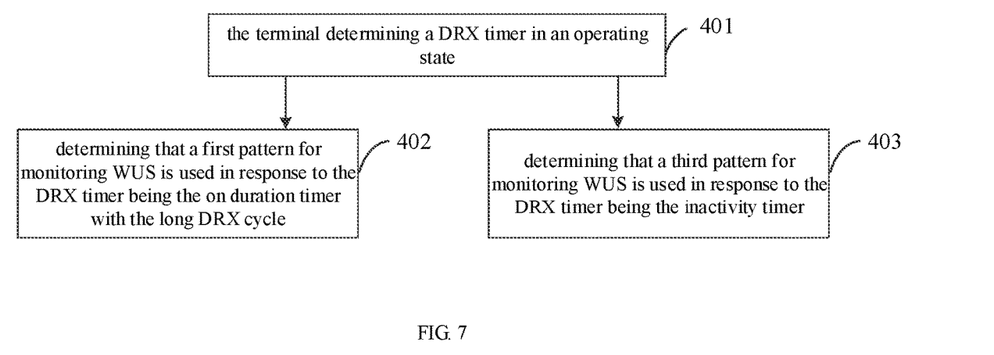
FIG. 7 is a flowchart illustrating another method for using a power saving signaling pattern according to an example embodiment.

FIG. 7 is a flowchart illustrating another method for using a power saving signaling pattern according to an example embodiment. The method may be executed by the terminal in the communications system as illustrated in FIG. 1. The method may include following.

At block 401, the terminal determines a DRX timer in an operating state.

The DRX timer may include the on duration timer with the long DRX cycle or the inactivity timer.

When the DRX timer is the on duration timer with the long DRX cycle, an action in block 402 is executed.

When the DRX timer is the inactivity timer, an action in block 403 is executed.

At block 402, it is determined that a first pattern for monitoring WUS is used in response to the DRX timer being the on duration timer with the long DRX cycle.

At block 403, it is determined that a third pattern for monitoring WUS is used in response to the DRX timer being the inactivity timer.

The first pattern for monitoring WUS is same with the third pattern for monitoring WUS, or the first pattern for monitoring WUS is different from the third pattern for monitoring WUS. The monitoring pattern is not limited in some embodiments.

Optionally, when the different first pattern for monitoring WUS and third pattern for monitoring WUS are used, a time delay of the third pattern for monitoring WUS is less than a time delay of the first pattern for monitoring WUS. Or, a monitoring granularity of the third pattern for monitoring WUS is higher than a monitoring granularity of the first pattern for monitoring WUS.

In summary, in the method provided in some embodiments, the terminal determines which pattern for monitoring WUS is used based on the type of the DRX timer, that is, different patterns for monitoring WUS may be used or the same pattern for monitoring WUS may be used when the DRX timer is in different operating states.

When different patterns for monitoring WUS are used, the time delay of the third pattern for monitoring WUS is less than the time delay of the first pattern for monitoring WUS. Therefore, the terminal reduces the influence on data transmission due to the time delay caused by WUS under the inactivity timer.

Figure 8:
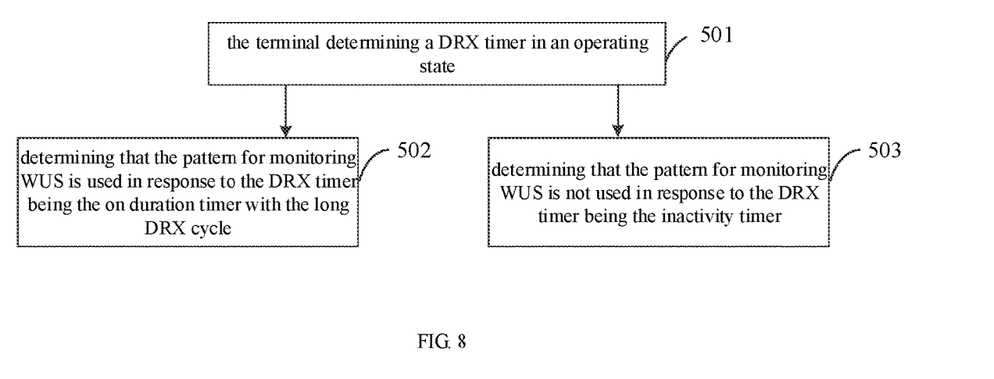
FIG. 8 is a flowchart illustrating another method for using a power saving signaling pattern according to an example embodiment.

FIG. 8 is a flowchart illustrating another method for using a power saving signaling pattern according to an example embodiment. The method may be executed by the terminal in the communications system as illustrated in FIG. 1. The method may include following.

At block 501, the terminal determines a DRX timer in an operating state.

The DRX timer may include the on duration timer with the long DRX cycle or the inactivity timer.

When the DRX timer is the on duration timer with the long DRX cycle, an action in block 502 is executed.

When the DRX timer is the inactivity timer, an action in block 503 is executed.

At block 502, it is determined that the pattern for monitoring WUS is used in response to the DRX timer being the on duration timer with the long DRX cycle.

At block 503, it is determined that the pattern for monitoring WUS is not used in response to the DRX timer being the inactivity timer.

In summary, in the method provided in some embodiments, the terminal determines whether the pattern for monitoring WUS is used based on the type of the DRX timer. When the DRX timer is the inactivity timer, it is determined that the pattern for monitoring WUS is not used.

Therefore, the terminal avoids the influence on data transmission due to the time delay caused by WUS under the inactivity timer.

Figure 9:
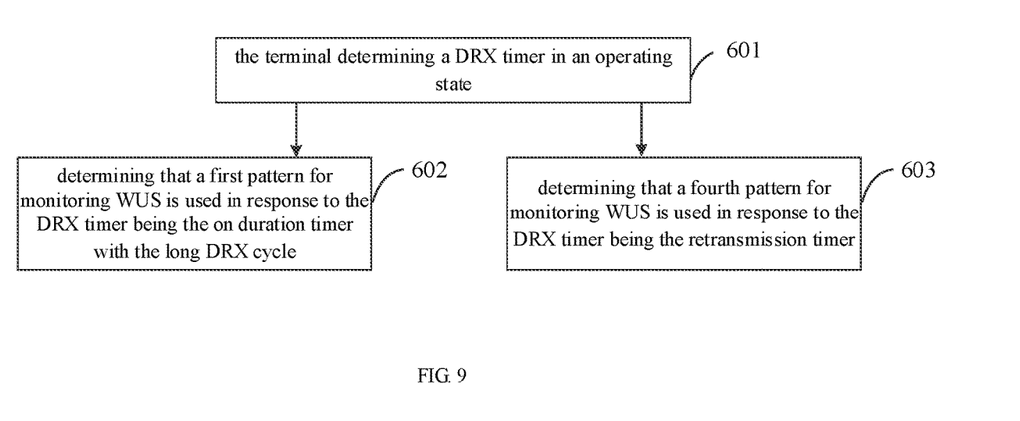
FIG. 9 is a flowchart illustrating another method for using a power saving signaling pattern according to an example embodiment.

FIG. 9 is a flowchart illustrating another method for using a power saving signaling pattern according to an example embodiment. The method may be executed by the terminal in the communications system as illustrated in FIG. 1. The method may include following.

At block 601, the terminal determines a DRX timer in an operating state.

The DRX timer may include the on duration timer with the long DRX cycle or the retransmission timer.

When the DRX timer is the on duration timer with the long DRX cycle, an action in block 602 is executed.

When the DRX timer is the retransmission timer, an action in block 603 is executed.

At block 602, it is determined that a first pattern for monitoring WUS is used in response to the DRX timer being the on duration timer with the long DRX cycle.

At block 603, it is determined that a fourth pattern for monitoring WUS is used in response to the DRX timer being the retransmission timer.

The first pattern for monitoring WUS is same with the fourth pattern for monitoring WUS, or the first pattern for monitoring WUS is different from the fourth pattern for monitoring WUS. The monitoring pattern is not limited in some embodiments.

Optionally, when the different first pattern for monitoring WUS and fourth pattern for monitoring WUS are used, a time delay of the fourth pattern for monitoring WUS is less than a time delay of the first pattern for monitoring WUS. Or, a monitoring granularity of the fourth pattern for monitoring WUS is higher than a monitoring granularity of the first pattern for monitoring WUS.

In summary, in the method provided in some embodiments, the terminal determines which pattern for monitoring WUS is used based on the type of the DRX timer, that is, different patterns for monitoring WUS may be used or the same pattern for monitoring WUS may be used when the DRX timer is in different operating states.

When different patterns for monitoring WUS are used, the time delay of the fourth pattern for monitoring WUS is less than the time delay of the first pattern for monitoring WUS. Therefore, the terminal reduces the influence on data transmission due to the time delay caused by WUS under the retransmission timer.

Figure 10:
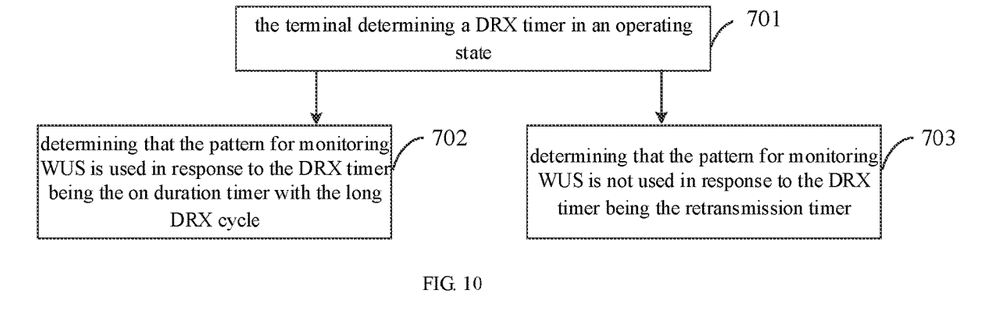
FIG. 10 is a flowchart illustrating another method for using a power saving signaling pattern according to an example embodiment.

FIG. 10 is a flowchart illustrating another method for using a power saving signaling pattern according to an example embodiment. The method may be executed by the terminal in the communications system as illustrated in FIG. 1. The method may include following.

At block 701, the terminal determines a DRX timer in an operating state.

The DRX timer may include the on duration timer with the long DRX cycle or the retransmission timer.

When the DRX timer is the on duration timer with the long DRX cycle, an action in block 402 is executed.

When the DRX timer is the retransmission timer, an action in block 403 is executed.

At block 702, it is determined that the pattern for monitoring WUS is used in response to the DRX timer being the on duration timer with the long DRX cycle.

At block 703, it is determined that the pattern for monitoring WUS is not used in response to the DRX timer being the retransmission timer.

In summary, in the method provided in some embodiments, the terminal determines whether the pattern for monitoring WUS is used based on the type of the DRX timer. When the DRX timer is the retransmission timer, it is determined that the pattern for monitoring WUS is not used. Therefore, the terminal avoids the influence on data transmission due to the time delay caused by WUS under the retransmission timer.

The foregoing embodiments may also be freely combined, and the embodiments of the disclosure do not limit the combination form of the foregoing embodiments. For example, the disclosure provides the following embodiments.

Figure 11:
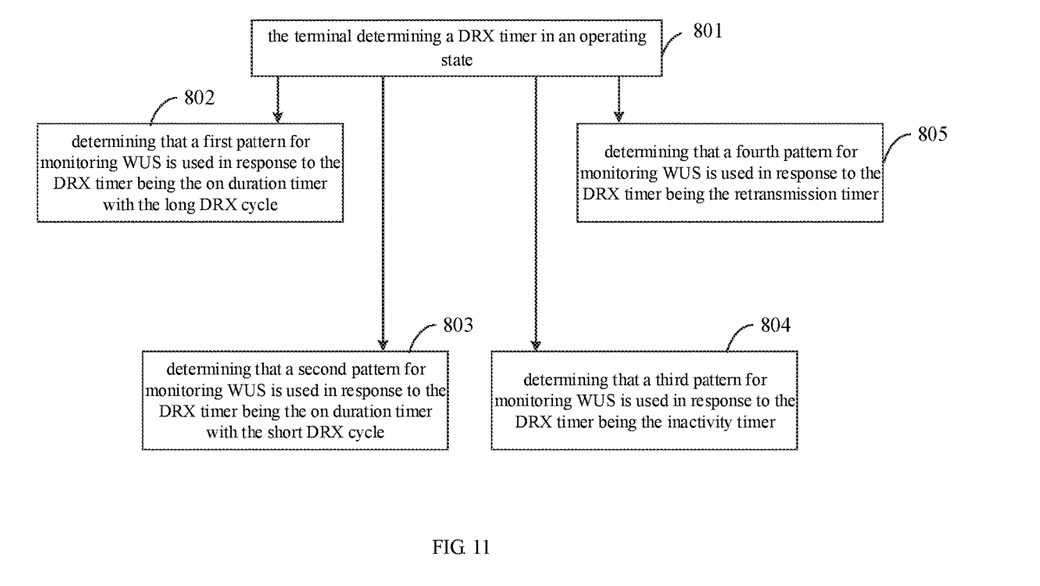
FIG. 11 is a flowchart illustrating another method for using a power saving signaling pattern according to an example embodiment.

FIG. 11 is a flowchart illustrating another method for using a power saving signaling pattern according to an example embodiment. The method may be executed by the terminal in the communications system as illustrated in FIG. 1. The method may include following.

At block 801, the terminal determines a DRX timer in an operating state. The operating state of the terminal may be one of the following four states.

At block 802, it is determined that a first pattern for monitoring WUS is used in response to the DRX timer being the on duration timer with the long DRX cycle.

At block 803, it is determined that a second pattern for monitoring WUS is used in response to the DRX timer being the on duration timer with the short DRX cycle.

At block 804, it is determined that a third pattern for monitoring WUS is used in response to the DRX timer being the inactivity timer.

At block 805, it is determined that a fourth pattern for monitoring WUS is used in response to the DRX timer being the retransmission timer.

It should be noted that, the pattern for monitoring WUS corresponding to each operating state of the DRX timer may be the same or different.

In an alternative embodiment based on any of the above embodiments, a method for using the pattern for monitoring the power saving signaling is preconfigured; or, a method for using the pattern for monitoring WUS is predefined. That is, the pattern for monitoring WUS may inform UE through system information or a dedicated signaling, or predefined according to a manner specified by the agreement.

In an alternative embodiment based on any of the above embodiments, the cycle of the power saving signaling is 1/N times or N times of the DRX cycle; the DRX cycle is the long DRX cycle or the short DRX cycle.

In an alternative embodiment based on any of the above embodiments, the cycle of the power saving signaling is 1/N times or N times of the DRX on duration timer; the DRX cycle is the long DRX cycle or the short DRX cycle; in which, N is an integer greater than or equal to 1.

The larger the value of N is, the smaller the monitoring granularity is and the higher the monitoring activity is. On the other hand, the smaller the value of N is, the larger the monitoring granularity is, and the lower the monitoring activity is.

In an alternative embodiment based on any of the above embodiments, the cycle of WUS is configured by an absolute time duration. The cycle of the WUS may be configured as a fixed time length, for example, 10 ms or 4 ms.

In an alternative embodiment based on any of the above embodiments, the pattern for monitoring WUS includes a start time offset of WUS; the start time offset of WUS is an offset configured with reference to an on duration of the DRX cycle.

The below are apparatus embodiments of the disclosure, which may be configured to implement the method embodiments of the disclosure. For details not disclosed in the apparatus embodiments of the disclosure, reference should be made to the method embodiments of the disclosure.

Figure 12:
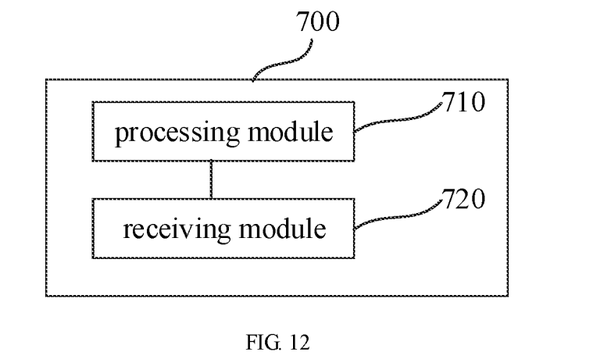
FIG. 12 is a block diagram illustrating an apparatus for using a power saving signaling pattern according to an example embodiment.

FIG. 12 is a block diagram illustrating an apparatus for using a power saving signaling pattern according to an example embodiment. The apparatus has the function of implementing the above method for using the power saving signaling pattern. The function may be achieved by hardware, or by hardware executing corresponding software. The apparatus 700 may include a processing module 710 and a receiving module 720.

The processing module 710 is configured to determine a Discontinuous Reception (DRX) timer in an operating state, the DRX timer being one of: an on duration timer with a long DRX cycle, an inactivity timer, an on duration timer with a short DRX cycle, and a retransmission timer.

The processing module 710 is further configured to determine whether a pattern for monitoring the power saving signaling is used based on the DRX timer.

The receiving module 720 is configured to monitor the power saving signaling based on the pattern for monitoring the power saving signaling in response to determining that the pattern for monitoring the power saving signaling is used.

Optionally, the processing module 710 is configured to determine that a first pattern for monitoring the power saving signaling is used in response to the DRX timer being the on duration timer with the long DRX cycle.

The processing module 710 is configured to determine that a second pattern for monitoring the power saving signaling is used in response to the DRX timer being the on duration timer with the short DRX cycle.

The first pattern for monitoring the power saving signaling is same with the second pattern for monitoring the power saving signaling, or the first pattern for monitoring the power saving signaling is different from the second pattern for monitoring the power saving signaling.

Optionally, the processing module 710 is configured to determine that the pattern for monitoring the power saving signaling is not used in response to the DRX timer being the on duration timer with the short DRX cycle.

Optionally, the processing module 710 is configured to, determine that a first pattern for monitoring the power saving signaling is used in response to the DRX timer being the on duration timer with the long DRX cycle.

The processing module 710 is configured to, determine that a third pattern for monitoring the power saving signaling is used in response to the DRX timer being the inactivity timer.

The first pattern for monitoring the power saving signaling is same with the third pattern for monitoring the power saving signaling, or the first pattern for monitoring the power saving signaling is different from the third pattern for monitoring the power saving signaling.

Optionally, the processing module 710 is configured to determine that the pattern for monitoring the power saving signaling is not used in response to the DRX timer being the inactivity timer.

Optionally, the processing module 710 is configured to, determine that a first pattern for monitoring the power saving signaling is used in response to the DRX timer being the on duration timer with the long DRX cycle.

The processing module 710 is configured to, determine that a fourth pattern for monitoring the power saving signaling is used in response to the DRX timer being the retransmission timer.

The first pattern for monitoring the power saving signaling is same with the fourth pattern for monitoring the power saving signaling, or the first pattern for monitoring the power saving signaling is different from the fourth pattern for monitoring the power saving signaling.

Optionally, the processing module 710 is configured to, determine that the pattern for monitoring the power saving signaling is not used in response to the DRX timer being the retransmission timer.

Optionally, a method for using the pattern for monitoring the power saving signaling is preconfigured; or a method for using the pattern for monitoring the power saving signaling is predefined.

Optionally, the pattern for monitoring the power saving signaling includes a cycle of the power saving signaling; the cycle of the power saving signaling is 1/N times or N times of a DRX cycle; the DRX cycle is the long DRX cycle or the short DRX cycle; or the cycle of the power saving signaling is 1/N times or N times of a DRX on duration timer, the DRX cycle is the long DRX cycle or the short DRX cycle.

N is an integer greater than or equal to 1.

Optionally, the pattern for monitoring the power saving signaling includes a cycle of the power saving signaling; the cycle of the power saving signaling is configured by an absolute time duration.

Optionally, the pattern for monitoring the power saving signaling includes a start time offset of the power saving signaling; the start time offset of the power saving signaling is an offset value configured with reference to an on duration of a DRX cycle.

Figure 13:
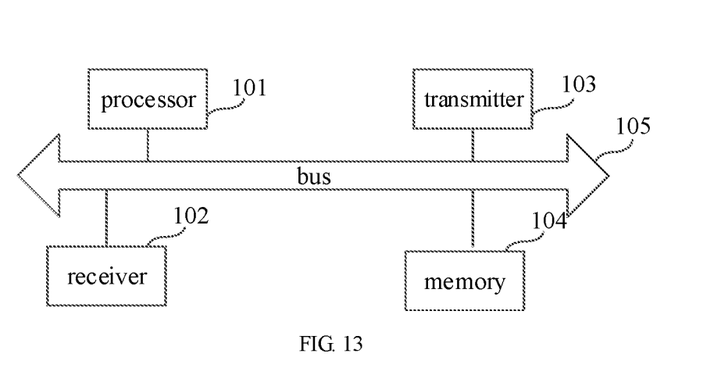
FIG. 13 is a block diagram illustrating a terminal according to an example embodiment.

FIG. 13 is a block diagram illustrating a terminal according to an example embodiment. The terminal includes a processor 101, a receiver 102, a transmitter 103, a memory 104, and a bus 105.

The processor 101 include one or more processing cores, and the processor 101 executes various function applications and information processing by running a software program or a module.

The receiver 102 and the transmitter 103 may be implemented as a communication component, which may be a communication chip.

The memory 104 is communicated to the processor 101 through the bus 105.

The memory 104 may be configured to store at least one instruction, and the processor 101 is configured to execute the at least one instruction to implement various actions in the above embodiments.

In addition, the memory 104 may be implemented by any type of volatile or non-volatile storage devices or their combination. The volatile or non-volatile storage device includes but not limited to a magnetic disk or an optical disk, an electrically erasable programmable read-only memory (EEPROM), an erasable programmable read-only memory (EPROM), a static random access memory (SRAM), a read-only memory (ROM), a magnetic memory, a flash memory and a programmable read-only memory (PROM).

In an exemplary embodiment, a non-transitory computer readable storage medium is further provided which includes instructions, such as the memory including instructions, in which the instructions may be executed by the processor of the terminal to complete the method for using the power saving signaling pattern. For example, the non-transitory computer readable storage medium may be a ROM, a random access memory (RAM), a CD-ROM, a magnetic tape, a floppy disk, an optical data storage device, etc.

A non-transitory computer readable storage medium is further provided. When the instructions in the non-transitory computer readable storage medium are executed by the processor of the terminal so that the terminal may execute the method for using the power saving signaling pattern.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for using a power saving signaling pattern, comprising:
   determining, by a terminal, a Discontinuous Reception (DRX) timer in an operating state, the DRX timer being one of: an on duration timer with a long DRX cycle and an on duration timer with a short DRX cycle;
   determining, by the terminal, a pattern for monitoring the power saving signaling based on the DRX timer, comprising:
      determining to use a first pattern for monitoring the power saving signaling in response to the DRX timer being the on duration timer with the long DRX cycle; and
      determining to use a second pattern for monitoring the power saving signaling in response to the DRX timer being the on duration timer with the short DRX cycle;
      wherein, the first pattern for monitoring the power saving signaling is same with the second pattern for monitoring the power saving signaling, or the first pattern for monitoring the power saving signaling is different from the second pattern for monitoring the power saving signaling; and
   monitoring, by the terminal, the power saving signaling based on the determined pattern for monitoring the power saving signaling.

2. The method as claimed in claim 1, wherein, determining by the terminal the pattern for monitoring the power saving signaling based on the DRX timer, comprises:
   determining not to use the pattern for monitoring the power saving signaling in response to the DRX timer being the on duration timer with the short DRX cycle.

3. The method as claimed in claim 1, further comprising:
   preconfiguring a method for using the pattern for monitoring the power saving signaling;
   or
   predefining a method for using the pattern for monitoring the power saving signaling.

4. The method as claimed in claim 1, wherein, the pattern for monitoring the power saving signaling comprises a cycle of the power saving signaling;
   the cycle of the power saving signaling is 1/N times or N times of a DRX cycle; the DRX cycle is the long DRX cycle or the short DRX cycle;
   or,
   the cycle of the power saving signaling is 1/N times or N times of a DRX on duration timer, wherein, N is an integer greater than or equal to 1.

5. A terminal, comprising:
   a processor;
   a transceiver coupled to the processor; and
   a memory configured to store instructions executable by the processor;
   wherein, the processor is configured to load and execute the executable instructions to:
   determine a Discontinuous Reception (DRX) timer in an operating state, the DRX timer being one of: an on duration timer with a long DRX cycle and an on duration timer with a short DRX cycle;
   determine a pattern for monitoring the power saving signaling based on the DRX timer; and
   monitor the power saving signaling based on the determined pattern for monitoring the power saving signaling;
   wherein, the processor is further configured to load and execute the executable instructions to:
   determine to use a first pattern for monitoring the power saving signaling in response to the DRX timer being the on duration timer with the long DRX cycle; and
   determine to use a second pattern for monitoring the power saving signaling in response to the DRX timer being the on duration timer with the short DRX cycle;
   wherein, the first pattern for monitoring the power saving signaling is same with the second pattern for monitoring the power saving signaling, or the first pattern for monitoring the power saving signaling is different from the second pattern for monitoring the power saving signaling.

6. The terminal as claimed in claim 5, wherein, the processor is further configured to load and execute the executable instructions to:
   determine not to use the pattern for monitoring the power saving signaling in response to the DRX timer being the on duration timer with the short DRX cycle.

7. The terminal as claimed in claim 5, wherein
   a method for using the pattern for monitoring the power saving signaling is preconfigured;
   or
   a method for using the pattern for monitoring the power saving signaling is predefined.

8. The terminal as claimed in claim 5, wherein, the pattern for monitoring the power saving signaling comprises a cycle of the power saving signaling;
   the cycle of the power saving signaling is 1/N times or N times of a DRX cycle; the DRX cycle is the long DRX cycle or the short DRX cycle;
   or,
   the cycle of the power saving signaling is 1/N times or N times of a DRX on duration timer, wherein, N is an integer greater than or equal to 1.

9. A non-transitory computer readable storage medium, wherein the computer readable storage medium stores at least one instruction, at least one program, a code set, or an instruction set, and the at least one instruction, the at least one program, the code set, or the instruction set is loaded and executed by a processor to implement to method for using a power saving signaling pattern, the method including:
   determining, by a terminal, a Discontinuous Reception (DRX) timer in an operating state, the DRX timer being one of: an on duration timer with a long DRX cycle and an on duration timer with a short DRX cycle;
   determining, by the terminal, a pattern for monitoring the power saving signaling based on the DRX timer, comprising:

determining to use a first pattern for monitoring the power saving signaling in response to the DRX timer being the on duration timer with the long DRX cycle; and determining to use a second pattern for monitoring the power saving signaling in response to the DRX timer being the on duration timer with the short DRX cycle;

wherein, the first pattern for monitoring the power saving signaling is same with the second pattern for monitoring the power saving signaling, or the first pattern for monitoring the power saving signaling is different from the second pattern for monitoring the power saving signaling; and monitoring, by the terminal, the power saving signaling based on the determined pattern for monitoring the power saving signaling.

10. The storage medium as claimed 9, wherein, determining by the terminal whether the pattern for monitoring the power saving signaling is used based on the DRX timer, comprises:

determining not to use the pattern for monitoring the power saving signaling in response to the DRX timer being the on duration timer with the short DRX cycle.

11. The storage medium as claimed 9, wherein the method further comprises:

preconfiguring a method for using the pattern for monitoring the power saving signaling;

or predefining a method for using the pattern for monitoring the power saving signaling.

12. The storage medium as claimed 9, wherein, the pattern for monitoring the power saving signaling comprises a cycle of the power saving signaling;

the cycle of the power saving signaling is 1/N times or N times of a DRX cycle; the DRX cycle is the long DRX cycle or the short DRX cycle;

or, the cycle of the power saving signaling is 1/N times or N times of a DRX on duration timer, wherein, N is an integer greater than or equal to 1.

\* \* \* \* \*